April 3, 1962 E. W. MURR 3,028,198
SAFETY SEAT CATCH
Filed May 12, 1960
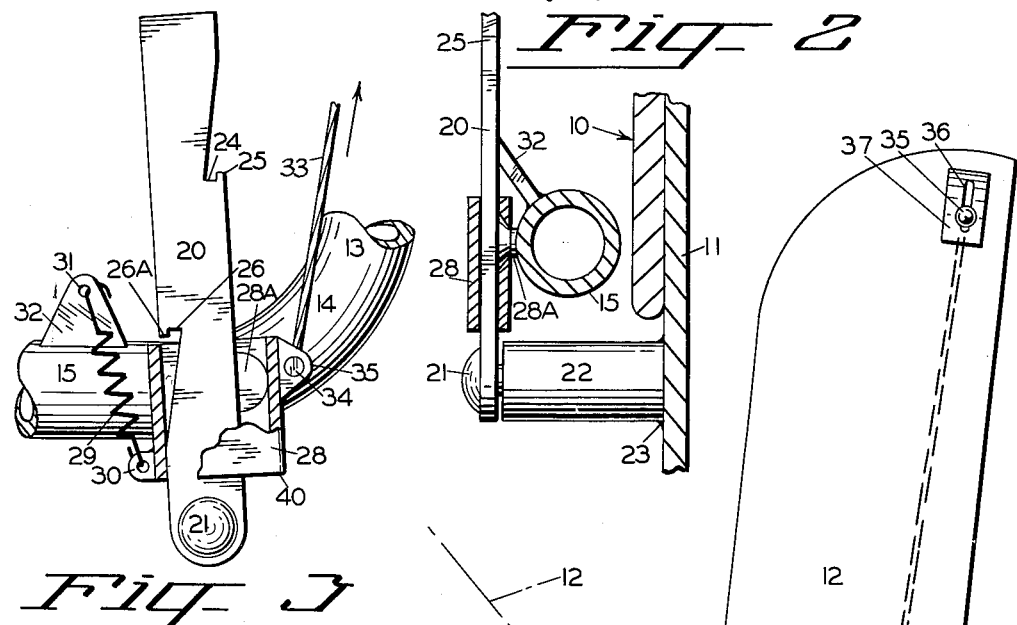
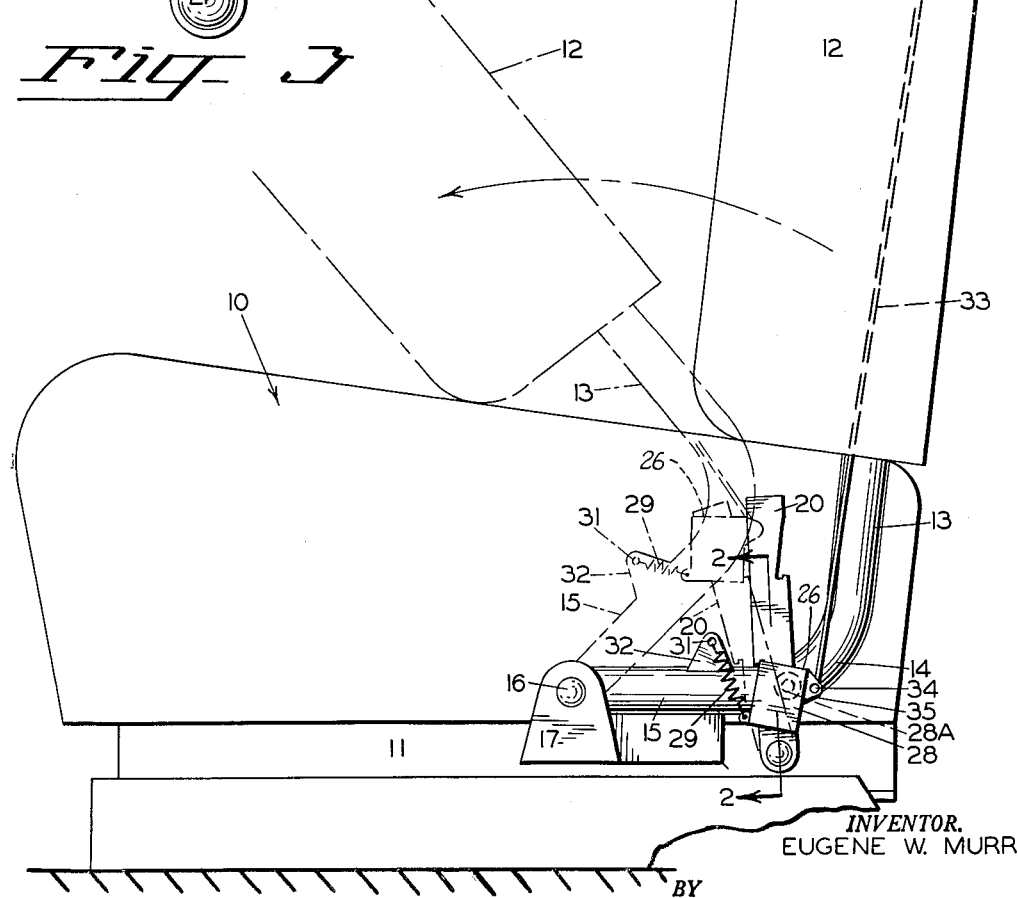
INVENTOR.
EUGENE W. MURR
BY Kimmel & Crowell
ATTORNEYS United States Patent Office 3,028,198
Patented Apr. 3, 1962

3,028,198
SAFETY SEAT CATCH
Eugene Walter Murr, 1123 F St., Springfield, Oreg.
Filed May 12, 1960, Ser. No. 28,604
2 Claims. (Cl. 297—216)

This invention relates to a safety seat catch, and more particularly to such a catch for the front seats of a motor vehicle.

The primary object of the invention is the provision of a device of this character which will latch the seat in position, either in its normal driving position, or in forward position, for the purpose of resisting movement to the seat such as might be occasioned by the weight of a passenger or a load thrown thereagainst in a collision.

As conducive to a clearer understanding of this invention it may here be pointed out that one of the frequent causes of injury to the driver or front seat passenger of a motor vehicle is occasioned when, upon impact, the rear seat passenger, or a load carried in equivalent position is thrown forwardly against the tiltable back of a conventional single or split-back motor seat. This drives the seat forwardly and throws the driver against the steering post, or his passenger against the dashboard, which frequently adds to or multiplies the injuries which might otherwise be reduced to a minimum.

One primary object of this invention is, therefore, the provision of means for latching a seat which will hold the same securely in its normal driving position unless manually unlatched by the operator.

Additionally, conventional seats of motor vehicles are normally so arranged that the weight will cause them to tilt back to driving position unless manually held in forward tilted position. This is frequently inconvenient when loading or unloading material or passengers into the back seat of a vehicle, and a further object of this invention is, therefore, the provision of such a latch which will effectively retain the seat in its forward tilted position so that the loading or unloading of passengers or articles from the rear seat will not be interfered with.

An additional object of the invention is the provision of such a seat catch which is sturdy and durable in construction, which is reliable and efficent in operation, and which is relatively simple and inexpensive to manufacture, install and utilize.

Still other objects reside in the combination of elements, arrangements of parts, and features of construction, all as will be more fully pointed out hereinafter, and disclosed in the accompanying drawings wherein there is shown a preferred form of this inventive concept.

In the drawings:

FIGURE 1 is a side elevational view of a motor vehicle seat of the split-back type showing the latch of the instant invention in association therewith, an alternative position of adjustment of the seat and latch being indicated in dotted lines.

FIGURE 2 is a sectional view taken substantially along the line 2—2 of FIG. 1 on an enlarged scale, as viewed in the direction indicated by the arrows, and FIGURE 3 is an enlarged fragmentary detail view of the latching device or catch shown in FIG. 1, parts thereof being broken away, and the latch being shown in a different position of adjustment.

Similar reference characters refer to similar parts throughout the several views of the drawing.

Having reference now to the drawings in detail, there is generally indicated at 10 the front seat of a motor vehicle, which may be of the split-back type. The seat 10 is supported on the customary base 11, and has pivotally mounted thereon a back 12. The back includes vertical frame members 13, which are curved as at 14 to form horizontal side frame members 15, which latter are pivotally mounted as by a pivot pin 16, to lugs 17 which project upwardly on opposite sides of the frame and the seat 10. Two of the frame members are provided for each front seat, or in the event of an undivided front seat, a single frame member at each end thereof.

The device of the instant invention comprises a latch plate 20 which is pivotally mounted on a pivot pin 21 which is rotatable in a sleeve or tube 22 which is fixedly secured to the side of the frame 11, as by welding 23 or the like (see FIG. 2).

The latch plate 20 is provided with an upper notch 24 having a retaining lip 25, on one side thereof, and an oppositely disposed lower notch 26 having a retaining lip 26a on the other side. When the seat is in its normal driving position, as best shown in FIG. 1, the notch 26 is adapted to be engaged by the upper edge 27 of a rectangular sleeve member 28, which is pivotally secured as by a pivot 28a on horizontal frame portion 15, so that the plate 20 is free to slide thereon, and which is of a dimension which will permit the edge 27 to tilt toward and away from the associated notch 26. The sleeve is normally biased to a position where the upper edge 27 is tilted toward the notch 26 by means of a spring 29 which has one end secured in an opening in a lug 30 secured to the lower end of the sleeve on the side adjacent the upper edge 27 portion which engages notch 26. The other end of the spring engages in an aperture 31 in a lug 32 which is fixed to the top of the frame member 15, the arrangement thus being such that the sleeve is normally tilted to a position where forward movement of the rear frame member 13 by tilting about its pivotal axis 16 is precluded.

The latch may be released by means of an operating rod 33, which is pivotally connected, as at 34, in a lug 35 which extends from the side of the sleeve opposite the edge which engages in the notch 26. Obviously, an upward pull on operating rod 33 will tilt the sleeve 28 to a position where the edge 27 is released from the latch 26, and upon forward tilting of the seat the parts will assume the position shown in dotted lines in FIG. 1. At this time the spring 29 will bias the sleeve to a position so that the lower edge 40 on the side opposite the edge 27 will engage in the notch 24 to prevent rearward movement of the seat back 12 until such time as the operating rod 33 is again actuated.

Actuation of the rod 33 is effected by means of a handle 35, which may extend through a slot 36 in an ornamental plate 37 which also serves to protect the upholstery of the seat at the upper end of the top. Obviously, any other readily accessible position for the operating handle may be employed if desired.

In the embodiment of the invention herein shown it is to be noted that the latch plate 20 and its associated sleeve 28 and its operating mechanism are positioned on the exterior side of the frame. This is done primarily for the purpose of clarity in illustration, and in conventional practice the parts will be positioned on the inner side of the frame, with the exception of course of the operating handle 35 which will be in a readily accessible position.

Similarly, while there is shown only one latch member for one side of the frame, in the case of dual or split-back seats a similar device will be provided on the opposite side of the vehicle.

From the foregoing it will now be seen that there is herein provided an improved latching device which accomplishes all the objects of this invention, and others, including many advantages of great practical utility and commercial importance.

As many embodiments may be made of this inventive

I claim:

1. A latch for the back of the horizontal front seat of a vehicle, said back being tiltable from a normally vertical to a substantially horizontal inclined position over said front seat, said seat including a horizontal support and a frame member having a normally horizontal portion pivoted to said support, said latch comprising a normally vertical latch bar having a notch therein, pivoted to said support, a sleeve having an upper and a lower edge loosely surrounding said latch bar, means pivoting said sleeve to said horizontal portion, a spring connected between said sleeve and said horizontal portion normally tilting said sleeve to a position with its upper edge engaging said notch, an operating rod for tilting said sleeve in the opposite direction to release said sleeve from said notch to permit forward tilting of said seat back, and an operating handle for moving said operating rod pivoted to said sleeve and extending to a point adjacent the top of said seat back.

2. A latch for the back of the horizontal front seat of a vehicle, said back being tiltable from a normally vertical to a substantially horizontal inclined position over said front seat, said seat including a horizontal support and a frame member having a normally horizontal portion pivoted to said support, said latch comprising a normally vertical latch bar having a notch therein, pivoted to said support, a sleeve having an upper and a lower edge loosely surrounding said latch bar, means pivoting said sleeve to said horizontal portion, a spring connected between said sleeve and said horizontal portion normally tilting said sleeve to a position with its upper edge engaging said notch, an operating rod for tilting said sleeve in the opposite direction to release said sleeve from said notch to permit forward tilting of said seat back, an operating handle for moving said operating rod pivoted to said sleeve and extending to a point adjacent the top of said seat back, said latch bar having a second oppositely disposed notch on the opposite side thereof engaged by the lower edge of said sleeve when said seat and hence said horizontal portion of said frame member is tilted forwardly by said spring when said seat back is in vertical position.

References Cited in the file of this patent
UNITED STATES PATENTS

| | | |
|---|---|---|
| 1,101,884 | Rumbaugh | June 30, 1914 |
| 1,683,553 | Kerr | Sept. 4, 1928 |
| 1,957,004 | Smith | May 1, 1934 |
| 2,559,548 | Seigneur | July 3, 1951 |
| 2,732,003 | Williams | Jan. 24, 1956 |